Dec. 24, 1963    W. P. CHAPMAN    3,115,039
CASING FOR CONDITION-SENSING ELEMENT
Filed Sept. 2, 1960
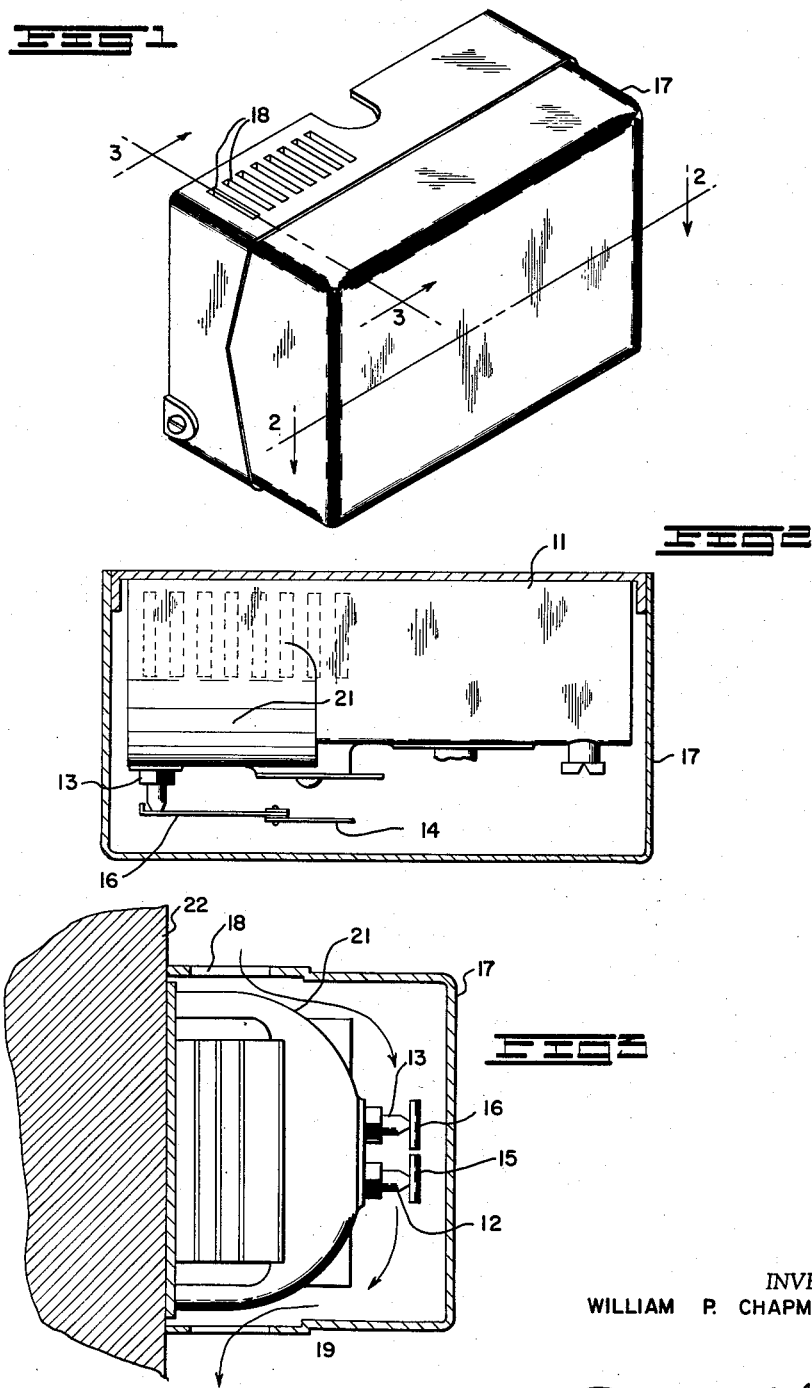
INVENTOR
WILLIAM P. CHAPMAN
BY
ATTORNEYS 3,115,039
CASING FOR CONDITION-SENSING ELEMENT
William P. Chapman, Fox Point, Wis., assignor to Johnson Service Company, Milwaukee, Wis., a corporation of Wisconsin
Filed Sept. 2, 1960, Ser. No. 53,667
1 Claim. (Cl. 73—363.5)

This invention relates to casings for condition-sensing elements. The invention is particularly useful in thermostats for controlling air conditioning systems, so it will be described in connection with that environment.

It is known in the art that the control action of room thermostats improves as the thermometric time lag or time constant of the thermostat becomes smaller. Since, in general, the thermometric lag varies inversely with the degree of freedom of circulation of room air over the sensing element or bimetallic bar, it obviously is desirable to obstruct as little as possible the flow of air over that bar.

Another factor to consider in designing a room thermostat is that of protecting the bimetallic bar from physical injury. A ventilated casing or cage surrounding the bimetallic bar affords adequate protection against inadvertent contact, and, if this were the only type of physical injury to be considered, it would be an easy task to position the ventilating openings to afford optimum air flow over the bar. However, experience has shown that children, and in many cases adults too, have discovered that by inserting paper clips or hair pins into the ventilating openings of conventional thermostats they can reach and move the bimetallic bar and thereby manipulate the thermostat. Inasmuch as the bimetallic bar is a fragile device, this activity results in frequent failures.

Those working in this field recognize these two conflicting demands for a small thermometric time lag and for adequate physical protection for the bimetallic bar, and have attempted to arrive at an acceptable compromise. However, up to the present time, applicant is not aware of any designs that are entirely satisfactory.

The object of this invention is to provide a casing for a condition-sensing element, such as a bimetallic bar, which reduces materially the risk of intentional or unintentional physical contact with the element and yet affords small time constants.

The preferred embodiment of the invention will now be described in detail with reference to the accompanying drawing, in which:

FIG. 1 is a perspective view of a pneumatic room thermostat incorporating the invention.

FIG. 2 is a sectional view taken on line 2—2 of FIG. 1.

FIG. 3 is a sectional view taken on line 3—3 of 1.

As shown in the drawing, the invention is embodied in a heating-cooling pneumatic thermostat having a body 11 carrying two leak ports 12 and 13 and supporting the two levers 14 (only one shown in FIG. 2) which carry the bimetallic bars 15 and 16. The bimetallic bars 15 and 16 regulate the rates of leakage through the leak ports 12 and 13, respectively, and are reversely set so that a rise in temperature causes one bar to move toward its leak port and causes the other to move away from its leak port. The present invention is concerned only with the sensing elements or bimetallic bars 15 and 16 so the other parts of the thermostat are not illustrated or described.

Fitted over the body 11 is a cover 17 formed with a plurality of rectangular slots 18 and 19 extending through its upper and lower faces, respectively. The curved surface 21 on body 11 and the cover 17 define a generally U-shaped flow passage through the thermostat leading from the slots 18 to the slots 19 and containing the bimetallic bars 15 and 16. These bars 15 and 16 are so positioned in the flow passage relatively to the openings 18 and 19 that there is no unobstructed straight line distance between any portion of either bar and any portion of any slot which is less than the distance between the slot and the wall 22 along an extension of that straight line. This geometry makes difficult insertion through the slots 18 or 19 of a foreign object long enough to reach the bimetallic bars.

The slots 18 and 19 are located adjacent the wall 22 on which the thermostat is mounted so that the convection currents (see the arrows in FIG. 3) which travel along the wall 22 are caused to pass through the flow passage in the thermostat and consequently over the bimetallic bars. It will be noticed, in FIG. 3, that the bimetallic bars are arranged edgewise in the flow passage and that, except for these bars, the flow passage is unobstructed. Because of this, and the fact that the flow passage is smoothly curved, i.e., generally streamlined, free air flow over the bimetallic bars is encouraged. As a result, thermometric lag is reduced. Actual comparison tests have shown that a room thermostat constructed in accordance with this invention has a time constant only about one-half as large as previous thermostats manufactured by applicant's assignee.

As stated previously, the drawing and description relate only to a preferred embodiment of the invention. Since many changes can be made in the structure of this embodiment without departing from the inventive concept, the following claim should provide the sole measure of the scope of the invention.

What is claimed is:

A tamper-resistant fluid condition-sensing device having a small time constant comprising
(a) a housing having a base adapted to be mounted on a stationary surface along which flows the fluid whose condition is to be sensed, and a cover that encloses a space located on the side of the base opposite said stationary surface;
(b) a body carried by the base and extending into said space, at least a portion of said body having a smoothly curved, convex outer periphery that is spaced inward from the cover to define a curved generally U-shaped flow passage;
(c) openings through the cover adjacent the base defining the entrance to and exit from said flow passage; and
(d) a flat condition-sensing element located in said flow passage and arranged edgewise to the direction of flow through the passage, the element being so positioned relatively to the openings that there is no unobstructed straight line distance between the element and either the entrance or exit opening that is less than the distance between that opening and said stationary surface along an extension of that straight line, (e) the parts being so arranged that the flow passage is unobstructed except for the presence of said condition-sensing element.

References Cited in the file of this patent
UNITED STATES PATENTS

| | | |
|---|---|---|
| 1,753,945 | Replogle | Apr. 8, 1930 |
| 2,110,884 | Leonard et al. | Mar. 15, 1938 |
| 2,225,080 | Newman | Dec. 7, 1940 |
| 2,806,108 | Babson | Sept. 10, 1957 |